United States Patent Office 3,280,162
Patented Oct. 18, 1966

3,280,162
BIS(2-AMINOETHYL) DITHIOLCARBONATE
SALTS AND PROCESS
Richard J. Gaul, Bedford Heights, Ohio, assignor to American Cyanamid Company, Stamford, Conn., a corporation of Maine
No Drawing. Continuation of application Ser. No. 803,372, Apr. 1, 1959. This application July 8, 1963, Ser. No. 293,272
9 Claims. (Cl. 260—455)

This is a continuation of copending U.S. application Serial No. 803,372 filed April 1, 1959, now abandoned.

The present invention relates to novel, useful organic compounds. More particularly, the instant discovery concerns novel substituted and unsubstituted bis(2-aminoethyl) dithiolcarbonate salts and methods of preparing same.

According to the present discovery compounds conforming to the generic formula

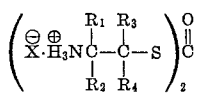

wherein X is the anion of an acid selected from the group consisting of HCl, HBr, and $H_2SO_4$, and $R_1$, $R_2$, $R_3$ and $R_4$ represent H, lower alkyl groups, aryl groups, and COOH, $R_1$ to $R_4$ representing the same or different groups, are prepared by reacting a substituted or unsubstituted 2-thiazoline-2-thiol of the formula

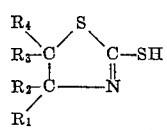

$R_1$–$R_4$ being the same as above, with an aqueous acid selected from the above group, reaction being made to take place at substantially atmospheric pressure.

Generally, temperatures in the range of 75° C. to 135° C. are suitable for the reaction. Preferably, however, temperatures in the range of 90° C. to 120° C. are employed.

Pursuant to the instant invention, best results are generally obtained by maintaining the reaction conditions hereinabove defined for a period of 15 to 40 hours. While these are optimum conditions, satisfactory yields are often obtained in a period of about 10 hours. On the other hand, reaction periods up to about 100 hours provide desirable yields also.

The amounts of acid and water present in the reaction may be varied from stoichiometric amounts to very large excesses based upon the 2-thiazoline-2-thiol reactant. For example, as much as a tenfold or greater excess of either or both components is contemplated herein.

The process of the present invention may be continuous, semi-continuous, or batch, as desired.

According to a particularly desirable embodiment of the present invention, a mixture of the 2-thiazoline-2-thiol reactant and concentrated hydrochloric acid is heated under reflux at atmospheric pressure for a period of about 20 hours. Subsequently, by cooling the product mixture, substantially all unreacted starting material, if any, is removed by filtration and the resulting filtrate evaporated to produce crystalline product. Purification of this product with an alcohol, e.g., a lower aliphatic monohydric alcohol, such as ethanol, is advantageous in that the products of the present invention are ethanol-insoluble and substantially all impurities may be removed therefrom by the alcohol treatment.

The novel products and compounds of the present invention are useful as chemical intermediates, hair-curling agents, and the like. For example, the novel products contemplated herein may be combined with sodium bicarbonate to release the corresponding 2-mercaptoethylamine. In addition, this latter class of compounds affords protection against radiation sickness and X-radiation damage.

Pursuant to the instant discovery, therefore, a novel and useful class of compounds is provided by a very straightforward reaction heretofore unknown.

Among other 2-thiazoline-2-thiol reactants of the type contemplated herein are 5-methyl-2-thiazoline-2-thiol;
5,5-dimethyl-4-ethyl-2-thiazoline-2-thiol;
5,5-dimethyl-4-carboxy-2-thiazoline-2-thiol;
5-meta-nitrophenyl-4-carboxy-2-thiazoline-2-thiol;
4-carboxy-2-thiazoline-2-thiol, and the like.

While the present invention is by no means limited thereto, the following examples are illustrative and represent several of the best modes contemplated for practicing the present invention. Unless otherwise indicated, the proportions recited in the following examples are given in parts by weight and reaction is made to take place at atmospheric pressure.

EXAMPLE I

Bis(2-aminoethyl) dithiolcarbonate dihydrochloride

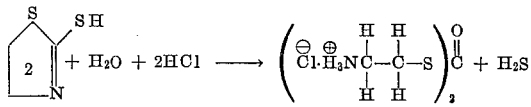

A mixture of 59.6 parts of 2-mercapto-2-thiazoline and 100 parts of concentrated hydrochloric acid is heated under reflux (bath temperature 110° C.) for 19.5 hours. Repeated chilling of the resulting solution followed by filtration gives a 36.5 parts (61.3 percent by weight of theory) recovery of starting material. The final filtrate is evaporated on a steam bath and the resulting crystalline paste treated with 2β-ethanol and filtered to give 12.4 parts of product, melting point 204.6° C.–205.6° C., with gas evolution. Further treatment of the alcoholic filtrate affords an additional 1.6 parts of product. The total yield is 14.0 parts (57.1 percent by weight based on recovered starting material). An analytical sample obtained by diluting a solution of the product in a minimum of water with a large volume of ethanol melts at 204.2° C.–205° C.

Analysis.—Calculated for $C_5H_{14}ON_2S_2Cl_2$: C, 23.72; H, 5.57; N, 11.07; S, 25.32; Cl, 28.00. Found: C, 23.79; H, 5.46; N, 11.26; S, 24.82; Cl, 28.48.

EXAMPLE II

Bis(2-aminoethyl) dithiolcarbonate dihydrochloride

A mixture of 119 parts of 2-mercapto-2-thiazoline and 250 parts of concentrated hydrochloric acid is heated under reflux at 120° C. for 90 hours, then chilled and filtered with suction to give 15.4 parts (12.9 percent by weight of theory) of recovered starting material. The filtrate is placed in a porcelain dish and evaporated to crystalline mush. Further removal of water is effected by thrice vacuum concentrating in the presence of 100 parts of benzene and 100 parts of ethanol at 90° C. and 15 millimeters mercury pressure, and finally by two such treatments with 100-part portions of absolute ethanol. The ethanol insoluble portion is removed by vacuum filtration and, after drying, amounts to 36.8 parts of product, melting point 198.7° C.–199.9° C.

EXAMPLE III

*Bis(2-aminobutyl) dithiolcarbonate dihydrochloride*

A mixture of 73.6 parts of 4-ethyl-2-thiazoline-2-thiol and 100 parts of concentrated hydrochloric acid is heated at 110° C. under reflux for twenty hours. The final solution is worked up essentially as described in Example I, above, to give an addition to recovered starting material, product bis(2-aminobutyl)dithiolcarbonate dihydrochloride

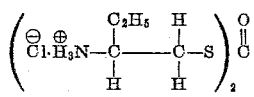

as a colorless, crystalline solid.

EXAMPLE IV

*Bis(2-amino-1-phenylethyl) dithiolcarbonate dihydrochloride*

A mixture of 97.6 parts of 5-phenyl-2-thiazoline-2-thiol and 100 parts of concentrated hydrochloric acid is heated at 100° C. for twenty-five hours. The final solution is strongly chilled and the precipitated starting material is recovered by vacuum filtration. The filtrate is evaporated essentially as described in Example I, above, and treated with 2-β-ethanol to give bis(2-amino-1-phenylethyl) dithiolcarbonate dihydrochloride

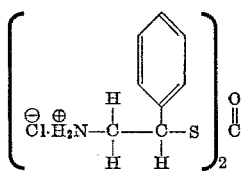

as a colorless, crystalline solid.

EXAMPLE V

*Bis(2-amino-2-methylpropyl) dithiolcarbonate dihydrochloride*

A mixture of 73.6 parts of 4,4-dimethyl-2-thiazoline-2-thiol and 200 parts of 6 Normal hydrochloric acid is heated to 90° C. for 100 hours. The final solution is strongly chilled to recover a small amount of unreacted starting material. The filtrate is vacuum concentrated to a crystalline paste which is treated essentially as described in Example II, above, to yield product bis(2-amino-2-methylpropyl) dithiolcarbonate dihydrochloride

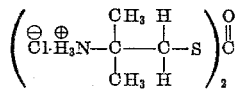

as the crystalline, alcohol-insoluble portion.

EXAMPLE VI

*Bis(2-amino-2-dimethylethyl) dithiolcarbonate dihydrobromide*

A mixture of 73.6 parts of 5,5-dimethyl-2-thiazoline-2-thiol and 100 parts of 48 percent aqueous hydrobromic acid is heated at 100° C. for 25 hours. The final solution is strongly chilled and the precipitated starting material is recovered by vacuum filtration. The filtrate is worked up essentially as described in Example I, above, to give crystalline product bis(2-amino-2-dimethylethyl) dithiolcarbonate dihydrobromide.

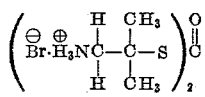

EXAMPLE VII

*Bis[2-amino-2-(para-chlorophenyl)ethyl]dithiolcarbonate disulfate*

A mixture of 115 parts of 4-(para-chlorophenyl)-2-thiazoline-2-thiol and 250 parts of 6 Normal sulfuric acid is heated at 120° C. for 100 hours. The resulting acid solution is strongly cooled and a small amount of precipitated starting material is removed by suction filtration. Excess sulfuric acid is neutralized with calcium hydroxide solution and the precipitated calcium sulfate is removed. The final filtrate is then vacuum concentrated to a paste which is treated essentially as described in Example II, above. Crystalline product bis[2-amino-2-(para-chlorophenyl)ethyl] dithiolcarbonate disulfate

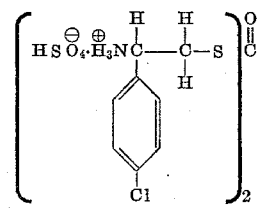

is obtained as the alcohol insoluble fraction.

EXAMPLE VIII

*Bis(2-amino-2-carboxy-1-phenylethyl) dithiolcarbonate dihydrochloride*

A mixture of 120 parts of 4-carboxy-5-phenyl-2-thiazoline-2-thiol and 150 parts of concentrated hydrochloric acid is heated under reflux at 110° C. for 100 hours. The final solution, upon intensive cooling, deposits substantially no unreacted starting material. The solution is vacuum concentrated to a paste which is treated essentially as described in Example II, above. From the final ethanol treatment there is obtained a nice crystalline product bis(2-amino-2-carboxy-1-phenylethyl) dithiolcarbonate dihydrochloride

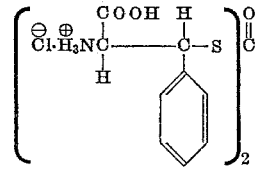

What is claimed is:

1. A compound conforming to the generic formula

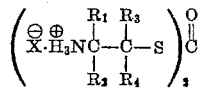

wherein X is the anion of an acid selected from the group consisting of HCl, HBr, and $H_2SO_4$, and $R_1$, $R_2$, $R_3$, and $R_4$ each represent a member selected from the group consisting of H, lower alkyl, phenyl, monochloro-substituted phenyl and COOH.

2. Bis(2-aminoethyl) dithiolcarbonate dihydrochloride.
3. Bis(2-aminobutyl) dithiolcarbonate dihydrochloride.
4. Bis(2-amino-1-phenylethyl) dithiolcarbonate dihydrochloride.
5. Bis(2-amino-2-methylpropyl) dithiolcarbonate dihydrochloride.
6. Bis[2-amino-2-(para-chlorophenyl)ethyl] dithiolcarbonate disulfate.
7. A method of preparing a bis(2-aminoethyl) dithiolcarbonate salt of the formula

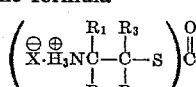

wherein X is the anion of an acid selected from the group consisting of HCl, HBr, and $H_2SO_4$, and $R_1$, $R_2$, $R_3$, and $R_4$ represent H, lower alkyl, phenyl, monochloro-substituted phenyl and COOH, which comprises bringing together a 2-thiazoline-2-thiol corresponding to the formula

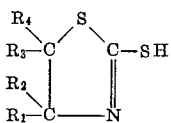

wherein $R_1$ to $R_4$ are the same as in the product formula above, with an aqueous acid selected from the group consisting of HCl, HBr, and $H_2SO_4$ at substantially atmospheric pressure for a period in the range of 10 to 100 hours and at a temperature in the range of 75° C. to 135° C. and recovering the resulting product bis(2-aminoethyl) dithiolcarbonate salt.

8. The process of claim 7 wherein the temperature is in the range of 90° C. to 120° C.

9. The process of claim 7 wherein reaction is carried out for a period in the range of 15 to 40 hours.

References Cited by the Examiner

Bose Ber. Deut Chem. 53, 2000–2002 (1920).
Elderfield: Heterocyclic compounds, vol. 5, page 623 (1957) John Wiley and Sons, New York, N.Y.
Taguchi et al.: Chem. Abs. 57, 2123g (1962).

CHARLES B. PARKER, *Primary Examiner.*

IRVING MARCUS, DANIEL D. HORWITZ, DALE R. MAHANAND, *Assistant Examiners.*